(12) United States Patent
Wilczynski et al.

(10) Patent No.: US 9,760,606 B1
(45) Date of Patent: Sep. 12, 2017

(54) SYSTEM TO GENERATE CURATED ONTOLOGIES

(71) Applicant: Palantir Technologies Inc., Palo Alto, CA (US)

(72) Inventors: Peter Wilczynski, San Francisco, CA (US); Ryan Beiermeister, Washington, DC (US); Timothy Slatcher, London (GB); Andrew Elder, Cherry Hills Village, CO (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/364,131

(22) Filed: Nov. 29, 2016

Related U.S. Application Data

(60) Provisional application No. 62/404,692, filed on Oct. 5, 2016.

(51) Int. Cl.
*G06F 15/18* (2006.01)
*G06F 17/30* (2006.01)
*G06N 99/00* (2010.01)

(52) U.S. Cl.
CPC .. *G06F 17/30477* (2013.01); *G06F 17/30321* (2013.01); *G06F 17/30353* (2013.01); *G06F 17/30595* (2013.01); *G06F 17/30607* (2013.01); *G06F 17/30734* (2013.01); *G06N 99/005* (2013.01)

(58) Field of Classification Search
USPC .......................................................... 706/12
See application file for complete search history.

(56) References Cited

U.S. PATENT DOCUMENTS

| | | | | | |
|---|---|---|---|---|---|
| 3,747,757 | A | * | 7/1973 | Kalthoff | B01D 3/24 209/164 |
| 4,778,219 | A | * | 10/1988 | Wilczynski | B03B 5/18 209/425 |
| 8,700,620 | B1 | * | 4/2014 | Lieberman | G06F 17/30731 707/728 |
| 9,348,880 | B1 | * | 5/2016 | Kramer | G06F 17/30566 |
| 9,514,205 | B1 | * | 12/2016 | Yazicioglu | G06F 17/30569 |
| 9,514,414 | B1 | * | 12/2016 | Rosswog | G06N 5/04 |
| 9,612,723 | B1 | * | 4/2017 | Elliot | G06F 3/0482 |
| 2004/0093344 | A1 | * | 5/2004 | Berger | G06F 17/30604 |
| 2016/0334974 | A1 | * | 11/2016 | Gray | G06F 3/04845 |

OTHER PUBLICATIONS

Context-Aware Mashup for Smart Mobile Devices Sejin Chun; Jooik Jung; Hyun-Bae Jeon; Beom-Jun Kim; Kyong-Ho Lee 2012 IEEE Asia-Pacific Services Computing Conference Year: 2012 pp. 179-186, DOI: 10.1109/APSCC.2012.15 IEEE Conference Publications.*

(Continued)

*Primary Examiner* — Michael B Holmes
(74) *Attorney, Agent, or Firm* — Schwegman Lundberg & Woessner, P.A.

(57) ABSTRACT

Example embodiments relate to a network-based ontology curation system employed for receiving a request to view a data object, curating an ontology associated with the data object on-the-fly based on attributes of the request that include device and user characteristics.

20 Claims, 7 Drawing Sheets

(56) References Cited

OTHER PUBLICATIONS

A Matchmaking Algorithm for Resource Discovery in Multi-user Settings Kimberly Garcia; Salma Velasco; Sonia Mendoza; Dominique Decouchant 2014 IEEE/WIC/ACM International Joint Conferences on Web Intelligence (WI) and Intelligent Agent Technologies (IAT) Year: 2014, vol. 3 pp. 352-359, DOI: 10.1109/WI-IAT.2014.188 IEEE Conference Publications.*

Design of Location-based Directory Facilitator in Context-Aware Environment Sung-Jun Na; Dong-Uk Kim; Yoe-Jin Yoon; Dong-Ryeol Shin 2008 10th International Conference on Advanced Communication Technology Year: 2008, vol. 3 pp. 2107-2110, DOI: 10.1109/ICACT.2008.4494204 IEEE Conference Publications.*

PRADA: Prioritized Random Access With Dynamic Access Barring for MTC in 3GPP LTE-A Networks Tzu-Ming Lin; Chia-Han Lee; Jen-Po Cheng; Wen-Tsuen Chen IEEE Transactions on Vehicular Technology Year: 2014, vol. 63, Issue: 5 pp. 2467-2472, DOI: 10.1109/TVT.2013.2290128 IEEE Journals & Magazines.*

* cited by examiner

SYSTEM TO GENERATE CURATED ONTOLOGIES

PRIORITY APPLICATION

This application claims priority to U.S. Provisional Application Ser. No. 62/404,692, filed Oct. 5, 2016, the disclosure of which is incorporated herein in its entirety by reference.

TECHNICAL FIELD

The present disclosure generally relates to the technical field of special-purpose machines that facilitate the curation and management of data sets, including computerized variants of such special-purpose machines and improvements to such variants, and to the technologies by which such special-purpose machines become improved compared to other special-purpose machines that facilitate integration of spreadsheet data. In particular, the present disclosure addresses systems and methods for the curation, management, and presentation of one or more data sets into one or more network applications.

BACKGROUND

Computer-based data systems, such as relational database management systems, typically organize data sets according to a fixed structure of tables and relationships. The structure may be described using an ontology, embodied in a database schema, comprising a data model that is used to represent the structure and reason about objects in the structure.

An ontology is a fixed data structure that defines a set of tables and relationships between those tables. Ontologies therefore define a set of concepts and relationships that represent the content and structure of a data set embodied as a database schema. Thus, an ontology of a database is normally fixed at the time that the database is created; any change to the ontology represented by the schema is extremely disruptive to the database system, and may require user intervention by an administrator to modify tables or relationships, or to create new tables or relationships.

However, the volumes of data in high-scale datasets are cumbersome to store, manage and curate in a structure described using an ontology. High-scale data sets may include sensor data received from one or more sensors. Sensor data is generally presented as a time series, such that each data point from the sensor includes a timestamp as well as metadata that may indicate a source of the data point (e.g., an identifier of a sensor). Sensor data is generally collected in real-time, over extended periods of time. As a result, high-scale data sets may comprise growing volumes of data that require vast storage space.

The inflexibility of a typical database ontology therefore presents a set of unique technical challenges when attempts are made to curate ontologies based on specifications and requirements and when incorporating high-scale datasets.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
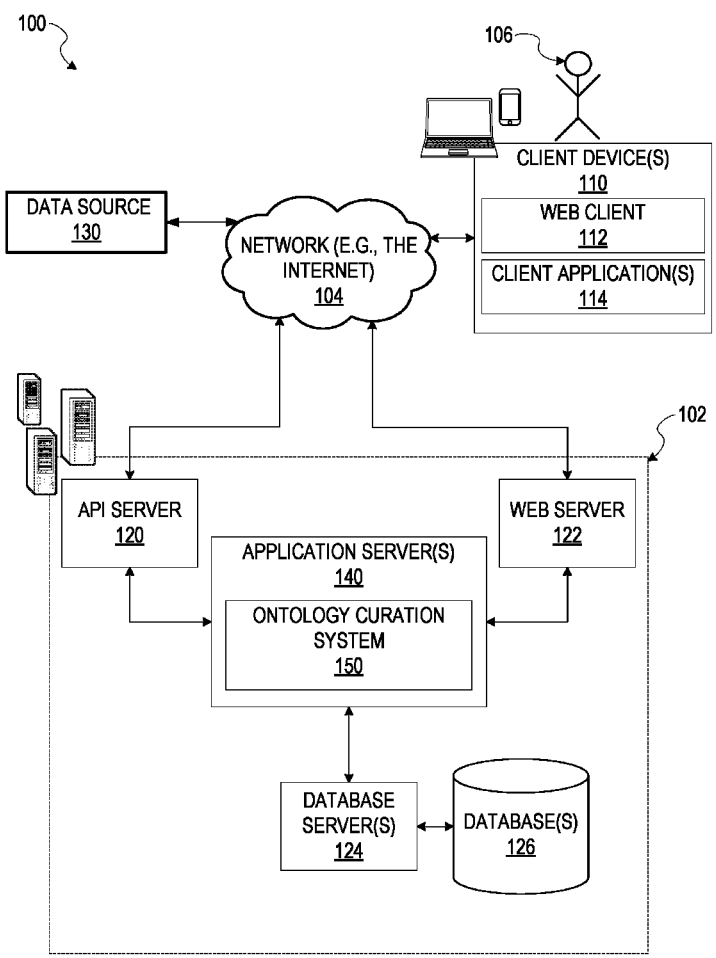
FIG. 1 is a network diagram depicting a network system comprising a group of application servers in communication with a network-based ontology curation system configured for managing and curating large-scale data sets, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a network-based ontology curation system employed for receiving a request to view a data object, curating an ontology associated with the data object on-the-fly based on attributes of the request that include device and user characteristics, and generating and causing display of a presentation of the data object based on the curated ontology. Computer-based database systems, such as relational database management systems, typically organize data according to a fixed structure of tables and relationships. The structure may be described using an ontology, embodied in a database schema, comprising a data model that is used to represent the structure and reason about objects in the structure. As discussed above, an ontology is normally fixed at the time that the database is created such that any change to the ontology represented by the schema is extremely disruptive to the database system, and may require user intervention by an administrator to modify tables or relationships, or to create new tables or relationships. Thus, a system to curate ontologies may be configured to generate the structure and the reasons about the objects in the structure at the time data is requested.

For example, consider a situation wherein two distinct requesting users request to view the same data object (e.g., the same search terms or reference to the same data object). One of the requesting users may be part of finance within the organization, while the other requesting user is with engineering. Each requesting user may therefore require an entirely different view of the requested data object—the requesting user from finance may primarily be interested in accounting data associated with the data object, while the other requesting user may primarily be interested in project data of projects associated with the data object.

In order to surface and present relevant data to the requesting users, the ontology curation system receives requests to view data objects, and curates ontologies of linked data associated with the data object of the request based on attributes of the request itself. In this way, the most relevant aspects of the requested data object may be presented to requesting users.

As an example, the request attributes may include a reference to a data object, or component of a data object, an identifier of the requesting device itself, as well as user attributes of a user making the request (e.g., user profile data). In response to receiving the request, the network-based ontology curation system identifies properties of the requested data object and accesses one or more databases to gather a set of data objects to include in a curated ontology associated with the data object for the requesting user. The network-based ontology curation system retrieves and prioritizes the set of data objects from the database based on the request attributes, and generates a curated ontology based on the prioritization. For example, the system may prioritize what to show and the placement of the various data objects. Separately, the underlying components for searching and applying an ontology may prioritize amongst the various data sources and/or the data from a given data source (e.g., for example, if there are duplicates, older or newer entries). In some example embodiments, the network-based ontology curation system generates and causes display of a view of the data object based on the curated ontology at a graphical user interface (GUI) at the requesting device. A format of the presentation may also be based on the request attributes.

The database accessed by the ontology curation system to retrieve the set of data objects may include a primary database and a secondary database. In one embodiment, the secondary database includes a relational database that contains foreign keys usable to access data objects within the primary database. A foreign key is a field in one table that uniquely identifies a row of another table. In other words, the foreign key is defined in a second table (e.g., the secondary database) but refers to the primary key in the first table (e.g., the primary database). For example, a database titled "SENSOR" has a primary key called "sensor_id." Another database titled "SENSOR DETAILS" has a foreign key which references "sensor_id" in order to uniquely identify the relationship between the databases. The ontology curation system generates a curated ontology based on the request attributes of the received request. In certain example embodiments, the ontology curation system may apply machine learning techniques to curate the ontology. Machine learning is a method used to devise complex models and algorithms that lend themselves to prediction. For example, the ontology curation system may index and store requests from various client devices in order to use the requests as training data to train the ontology curation system to curate ontologies based on requests. The requests may include requests from client devices for specific types of data from various databases, as well as presentation formats, and priorities of data objects. For example, mobile devices associated with an organization may request a particular set of data objects from the database, whereas desktop devices associated with the organization more often request another set of data objects.

In some example embodiments, the ontology curation system may simply be configured based on user inputs defining priorities of data objects based on request attributes. For example, the ontology curation system may receive a configuration specifying priorities, and present formats of ontologies based on requests attributes. Request attributes may include device identifiers, device attributes of the requesting device (e.g., mobile, desktop, wearable, etc.) organization identifiers, user identifiers, as well as team identifiers of specific teams within organizations (e.g., marketing, security, sales).

FIG. 1 is a network diagram illustrating a network environment 100 suitable for operating an ontology curation system 150. A networked system 102 provides server-side functionality, via a network 104 (e.g., an intranet, the Internet or a Wide Area Network (WAN)), to one or more clients such as the client device(s) 110 and server 130. In some example embodiments, the server 130 may include another client application configured to run queries against the ontology curation system 150 in order to generate and utilize curated ontologies. FIG. 1 illustrates a web client 112 and client application(s) 114 executing on respective client device(s) 110.

An Application Program Interface (API) server 120 and a web server 122 are coupled to, and provide programmatic and web interfaces respectively to, one or more application server(s) 140. The application servers 140 host the ontology curation system 150. The application server(s) 140 are, in turn, shown to be coupled to one or more database servers 124 that facilitate access to one or more databases 126.

The ontology curation system 150 curates ontologies based on input data and request attributes from requests received from client devices (e.g., client device(s) 110). For example, the ontology curation system 150 is configured to receive requests to access or view data objects from the client device(s) 110, access the database(s) 126 to retrieve a set of data objects based on request attributes of the request, curate an ontology based on the set of data objects, and cause display of a presentation of the curated ontology at the client device(s) 110. The database(s) 126 may include one or more databases.

As shown, the network environment 100 includes the client device(s) 110 in communication with the networked system 102 over the network 104. The networked system 102 communicates and exchanges data with the client device(s) 110 that pertains to various functions and aspects associated with the networked system 102 and its users. Likewise, the client device(s) 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the networked system 102 to exchange data with the networked system 102 over the network 104.

The client device(s) 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device(s) 110 and the networked system 102 may involve user-selected functions available through one or more user interfaces (UIs). The UIs may be specifically associated with the web client 112 (e.g., a browser) or the client application 114, executing on the client device(s) 110, and in communication with the networked system 102.

Figure 2:
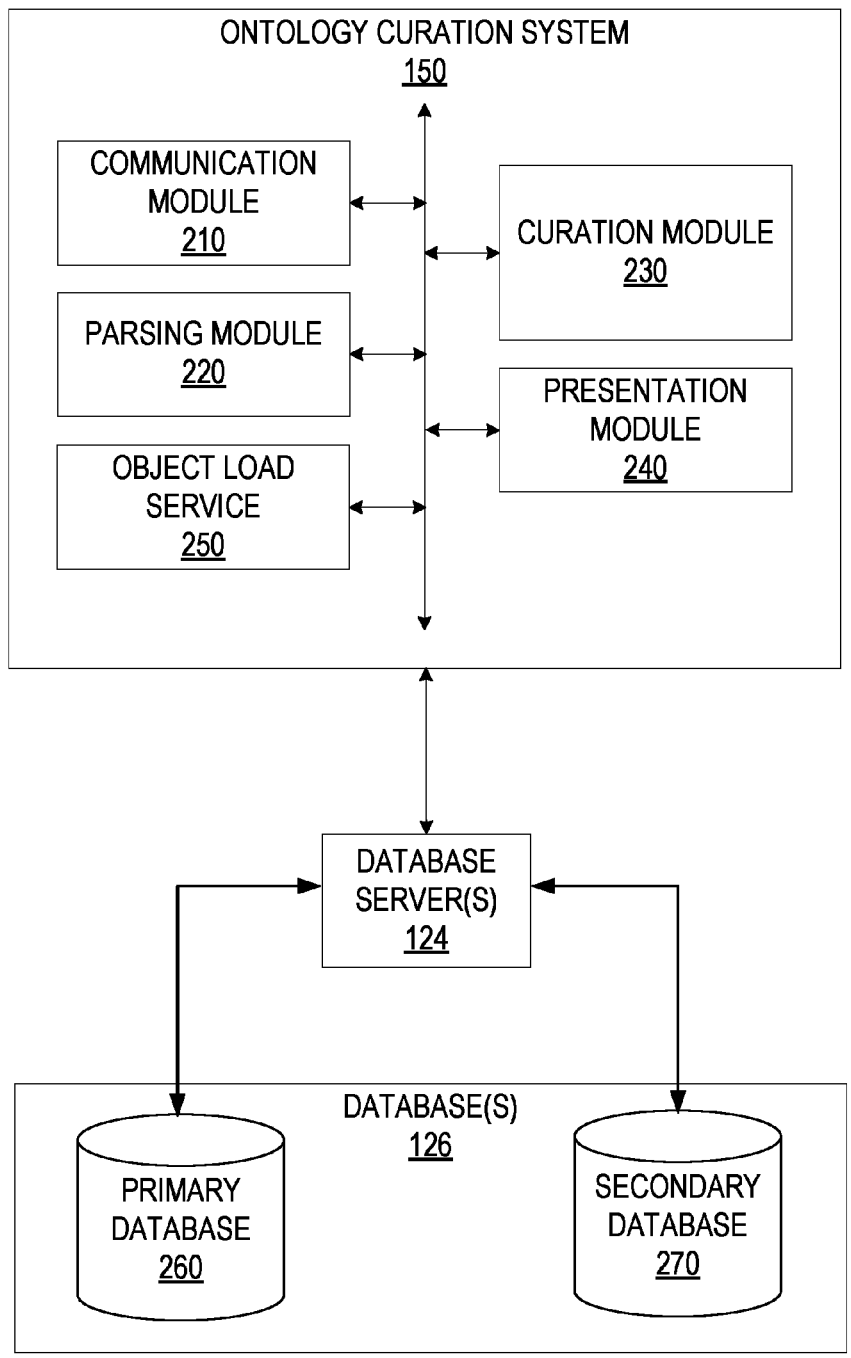
FIG. 2 is a block diagram illustrating various components of the ontology curation system, which is provided as part of the network system, consistent with some embodiments.

FIG. 2 is a block diagram illustrating various components of the ontology curation system 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the ontology curation system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the ontology curation system 150 may be combined into a single module, or subdivided among multiple modules. It shall be appreciated that while the functional components (e.g., modules) of FIG. 2 are discussed in the singular sense, in other embodiments, multiple instances of one or more of the modules may be employed.

The ontology curation system 150 is shown as including a communication module 210, a parsing module 220, a curation module 230, a presentation module 240, and an object load service 250, all configured to communicate with each other and the database(s) 126 (e.g., via a bus, shared memory, a switch, or application programming interfaces (APIs)). Databases 126 may comprise one or more databases, including, for example a primary database 260 and a secondary database 270. In some example embodiments, the primary database 260 is organized in an ontology, and the secondary database 270 is organized in a distinct format, that is not an ontology. In some example embodiments, the secondary database 270 may contain high-scale datasets including time series data. In further embodiments, primary database 260 and/or secondary database 270 may be one or more key-value data stores.

In some example embodiments, the application server 140 transmits requests to the ontology curation system 150, which in turn sends the request along to the database server 124. The database server 124 may then query a primary database (e.g., the primary database 260). In such embodiments, the primary database 260 may employ an ontology schema and return search results based on the request received from the database server 124. The search results may for example include data objects including a string (e.g., text string), or JSON data object.

In further embodiments, the ontology curation system 150 may include a translation layer (e.g., Object Load Service 250) configured to intercept returned queries from the primary database 260 to add type, change a type, or to otherwise vary the returned query based on the custom ontology. For example, the object load service 250 may be configured to enrich the returned search results with data retrieved from another data source, such as the secondary database 270, wherein the secondary database 270 may comprise: high-scale data sets, that include time series data; an IP geocoding service that includes data useable to enrich data objects (e.g., IP addresses) received from the primary database 260 with latitude/longitude coordinates; as well as a map tile database that contains map imagery depicting locations of coordinates.

In some example embodiments, the primary database 260 returns a data object in response to receiving the request from the ontology curation system 150, wherein the data object is a JSON data object that contains a primary key. The ontology curation system 150 receives the JSON object and queries the secondary database 270 using the primary key of the JSON data object as a query.

The communication module 210 provides functionality to communicate with client devices (e.g., client device(s) 110) in order to receive requests to view data objects. The requests may include a reference to a data object or a component of a data object, as well as attributes and properties of the requesting device (client device 110), and the requesting user (e.g., user 106). The communication module 210 communicates requests.

Object components of a data object may include object properties, object media, object notes, and object links. The object properties are structured pieces of information that define behavior and characteristics of the data object (e.g., a data type). The object media include binary attachments of data that may include images, text, video, and other specialized forms. The object notes are free text containers of information that provide details about the data object itself. The object links define connections of any one data object to one or more linked data objects. Data objects may also include metadata that defines geo-coordinates (e.g., to indicate a source location of the data object), as well as temporal data (e.g., defining a point in time in which the data object was collected). In some example embodiments, the data objects may further include an Access Control List (ACL), which is a list of Access Control Items (ACIs) Each ACI defines a level of permission that a particular user or user group is permitted to the data object. An ACL includes a set of these permissions.

The presentation module 240 generates and causes display of a presentation of the data object based on the curated ontology at the client device(s) 110. The presentation may be generated based on: the type of data to include in an object view; pre-configured presentation requirements associated with data types; as well as access credentials of a requesting user. For example, some users may have greater access privileges than other users, such that some data may not be viewable. In some example embodiments, the presentation of the data object is based on request attributes that include one or more device properties of the requesting device (e.g., client device(s) 110). For example, the presentation of the data object may differ based on the requesting device being a mobile device versus a desktop device, as both devices would receive different curated ontologies.

In some example embodiments, the presentation module 240 also determines a presentation format of each linked data object in the curated ontology based on corresponding object components. For example, a first data object may include object components indicating that the first data object can be displayed in a map image, while a second data object includes object components that indicate that the second data object must be displayed in a time series. The presentation module 240 formats the presentation of the curated ontology based on the object components.

FIG. 2 also includes a depiction of database(s) 126, wherein the database(s) 126 may include a primary database 260 and a secondary database 270. In some example embodiments, the primary database 260 may receive data (e.g., high-scale data sets) from a data source. The parsing module 220 may access the data from the database 260 and parse out data attributes to be stored within the secondary database 270 (e.g., identifiers within the data set, and time stamps.). In some example embodiments, the secondary database 270 may be a columnar database. The parsing module 220 may further assign a set of foreign keys to the parsed data of the secondary database 270 such that the foreign keys identify corresponding rows of data within the primary database 260.

Figure 3:
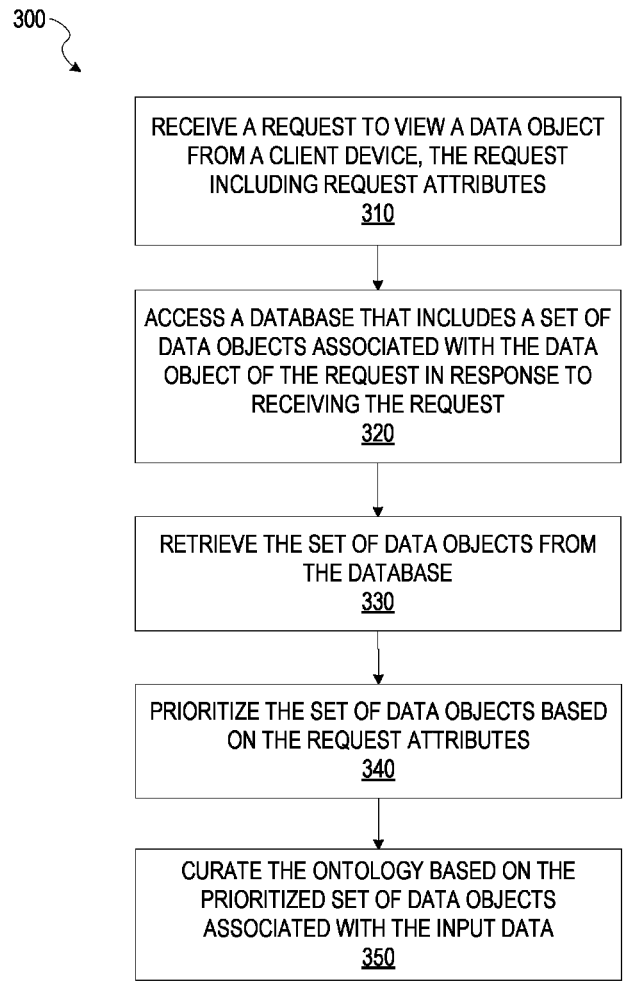
FIG. 3 is a flowchart illustrating a method for curating an ontology based on a prioritized set of data objects, according to some example embodiments.

FIG. 3 is a flowchart illustrating a method 300 for curating an ontology based on a prioritized set of data objects, according to some example embodiments. The method 300 is embodied in computer-readable instructions for execution by one or more processors such that the operations of the method 300 are performed in part or in whole by the network-based ontology curation system 150; accordingly, the method 300 is described below by way of example with reference thereto. However, it shall be appreciated that at least some of the operations of the method 300 may be deployed on various other hardware configurations, and the method 300 is not intended to be limited to the network-based ontology curation system 150.

At operation 310, the communication module 210 receives a request to view or otherwise access a data object from a client device (e.g., client device(s) 110). The request may include an identifier of a data object (e.g., based on a search query, or file name). In one embodiment, the request may comprise request attributes. In another embodiment, the request attributes may include at least a user identifier or a device identifier of the client device(s) 110. The request may be to access a data object representative of a person. In some example embodiments, the request does not need to include an identifier at all, and rather, the request may simply be a search query in which search results from the primary database may be used to query the secondary database. The system may thereby return relevant information from the primary and/or secondary database. For example, at operation 310, the user 106 may send a request to the ontology curation system 150 for a specific data object, or to simple conduct a search based on a search query.

At operation 320, the communication module 210 queries the API server 120, the API server 120 queries the database server 124, and the database server queries one or more databases (e.g., the databases 126). In some embodiments, database(s) 126 comprises at least a primary database (e.g., primary database 260) and a secondary database (e.g., secondary database 270).

For example, in response to the request from the user 106, the ontology curation system 150 search a secondary database (e.g., among the databases 126) to retrieve a set of data objects based on the data sources searches, the use case (of the request), the user profile data, as well as other attribute s discussed herein.

At operation 330, the ontology curation system 150 receives one or more data objects, as discussed above, from the databases 126. The set of data objects retrieved from the database(s) 126 may all be linked or otherwise related to the data object based on data object components (e.g., links). Links in an ontology are used only between objects in the ontology model, and the information for the links/objects may be stored wholly within the primary database 260.

At operation 340, the curation module 230 prioritizes the set of data objects retrieved from the database(s) 126 based on the request attributes of the request from the client device(s) 110. The request attributes include, for example, an identifier of the client device(s) 110, properties and characteristics of the client device(s) 110 (e.g., device type, display type, display resolution, mobile or desktop, etc.), as well as attributes of the user 106 (e.g., based on user profile data). For example, certain data objects among the set of data objects may be prioritized more highly based on the client device(s) 110 being a mobile device versus a desktop device. As discussed above, the prioritization may be based on a use case of the data object as well as the data type. In some example embodiments, client device display size may also play a role. In some example embodiments, the set of data objects are also prioritized based on user attributes from a user profile, such as title, occupation, organization role, etc.

At operation 350, the curation module 230 curates an ontology based on the prioritized set of data objects and the attributes of the request from the client device(s) 110. The curated ontology may thereby be delivered to the presentation module 240 in order to generate a presentation of the data object based on the curated ontology. The ontology consists of: a list of all object types; a list of all object properties; a list of all links between data objects; a list of all allowable property types for a given object type; as well as a list of all allowable link types for a given object type.

In some example embodiments, a default view of the ontology may be overwritten by a custom view. One such modeling may be a tree, in which there are custom views at each level, and overriding at lower levels (when there is greater specificity as to the circumstances behind the request). Advantages of such embodiments include starting with a broad base ontology (e.g., only person data objects) that may be refined based on specific use cases. For example, different person data objects (e.g., athletes, mechanics, pilots) or even further refined (for example, airplane pilots, stewards, traffic controller) if dealing with a specific use case (for example, transportation).

Figure 4:
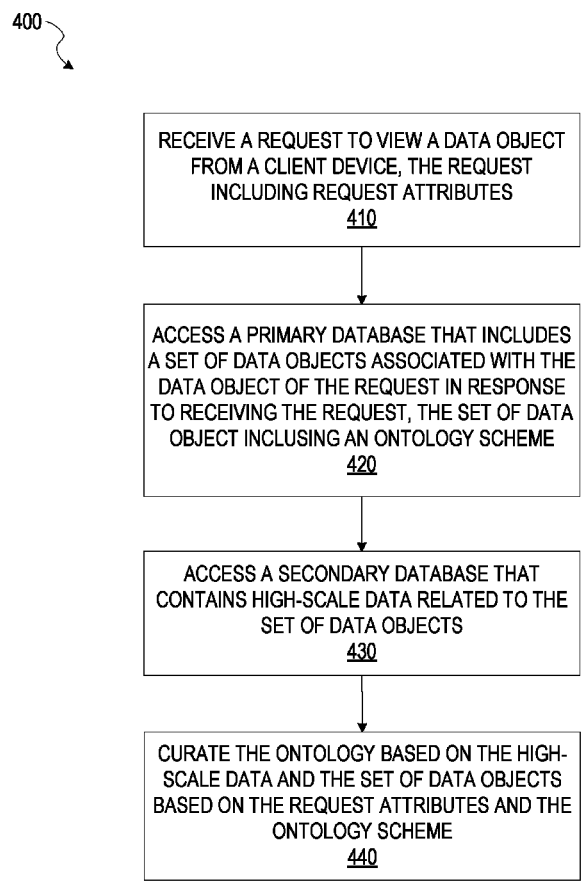
FIG. 4 is a flowchart illustrating a method for curating an ontology based on a request to view a data object, according to some example embodiments.

FIG. 4 is a flowchart illustrating a method 400 for curating an ontology based on a request to view a data object, according to some example embodiments. The method 400 is embodied in computer-readable instructions for execution by one or more processors such that the operations of the method 400 are performed in part or in whole by the network-based ontology curation system 150; accordingly, the method 400 is described below by way of example with reference thereto. However, it shall be appreciated that at least some of the operations of the method 400 may be deployed on various other hardware configurations, and the method 400 is not intended to be limited to the network-based ontology curation system 150. At operation 410, the communication module 210 receives a request to view or otherwise access a data object from a client device (e.g., client device(s) 110). The request may include an identifier of a data object (e.g., based on a search query, or file name). In one embodiment, the request may comprise request attributes. In another embodiment, the request attributes may include at least a user identifier or a device identifier of the client device(s) 110. The request may be to access a data object representative of a person. In some example embodiments, the request does not need to include an identifier at all, and rather, the request may simply be a search query in which search results from the primary database may be used to query the secondary database. The system may thereby return relevant information from the primary and/or secondary database. For example, at operation 410, the user 106 may send a request to the ontology curation system 150 for a specific data object, or to simple conduct a search based on a search query.

At operation 420, the communication module 210 queries the API server 120, the API server 120 queries the database server 124, and the database server queries one or more databases (e.g., the databases 126). In some embodiments, database(s) 126 comprises at least a primary database (e.g., primary database 260) and a secondary database (e.g., secondary database 270).

For example, in response to the request from the user 106, the ontology curation system 150 search a primary database 260 to retrieve a data object or set of data objects based on the request attributes. The data object or set of data objects within the primary database 260 may contain corresponding ontology schema, as well as data attributes such as identifiers.

At operation 430, the ontology curation system 150 receives the one or more data objects from the primary database 260, and accesses a secondary database 270 to retrieve related data objects. For example, the secondary database 270 may contain high-scale data including time series data. The ontology curation system searches the secondary database 270 and retrieves high-scale data related to the one or more data objects retrieved from the primary database, based on the data attributes of the one or more data objects.

At operation 440, the curation module 230 curates an ontology based on the high-scale data, the set of data objects, the request attributes of the request, and the ontology schema of the one or more data objects from the primary database 260. The curated ontology may thereby be delivered to the presentation module 240 in order to generate a presentation of the data object based on the curated ontology. The ontology consists of: a list of all object types; a list of all object properties; a list of all links between data objects; a list of all allowable property types for a given object type; as well as a list of all allowable link types for a given object type.

Figure 5:
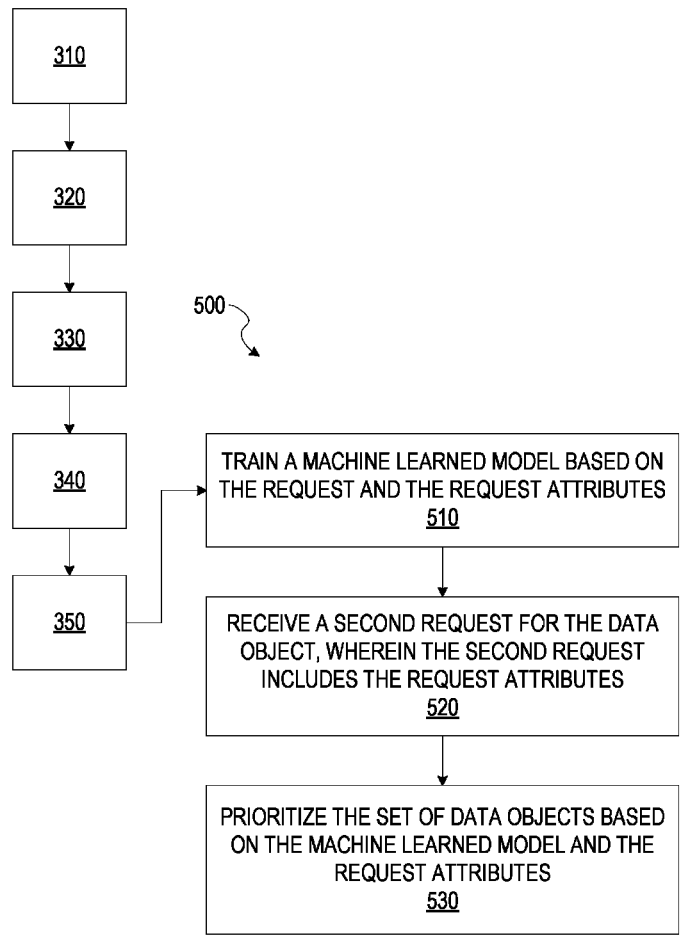
FIG. 5 is a flowchart illustrating a method for prioritizing a set of data objects according to a machine-learning model, consistent with some embodiments.

FIG. 5 is a flowchart illustrating a method 500 for prioritizing a set of data objects according to a machine-learning model, consistent with some embodiments. As shown in FIG. 5, one or more operations 510, 520, and 530 may be performed as part (e.g., a precursor task, a subroutine, or a portion) of the method 300, in which the ontology curation system 150 curates an ontology based on a prioritized set of data objects, according to some example embodiments.

At operation 510, the ontology curation system 150 trains a machine-learning model based on the request to view a data object and request attributes, wherein the request attributes further include ontology configurations. For example, the request may include ontology configuration data to define a prioritization of a set of data objects linked to a requested data object based on object components of the set of data objects. For example, the prioritization may indicate that client devices with a particular set of characteristics (e.g., mobile, desktop client, wearable, etc.) have prioritization requirements that define what types of data objects should be presented. In some embodiments, the prioritization may use artificial intelligence techniques known to one of ordinary skill in the art, such as a neural network, deep learning, support vector machines, clustering, and/or Bayesian networks.

At operation 520, the ontology curation system 150 receives a second request to view the same data object. The second request includes similar request attributes (e.g., based on having similar device characteristics and input data), however does not include any ontology configurations.

At operation 530, the curation module 230 curates a set of data objects in response to the second request based on the machine-learning model and the request attributes of the second request.

Figure 6:
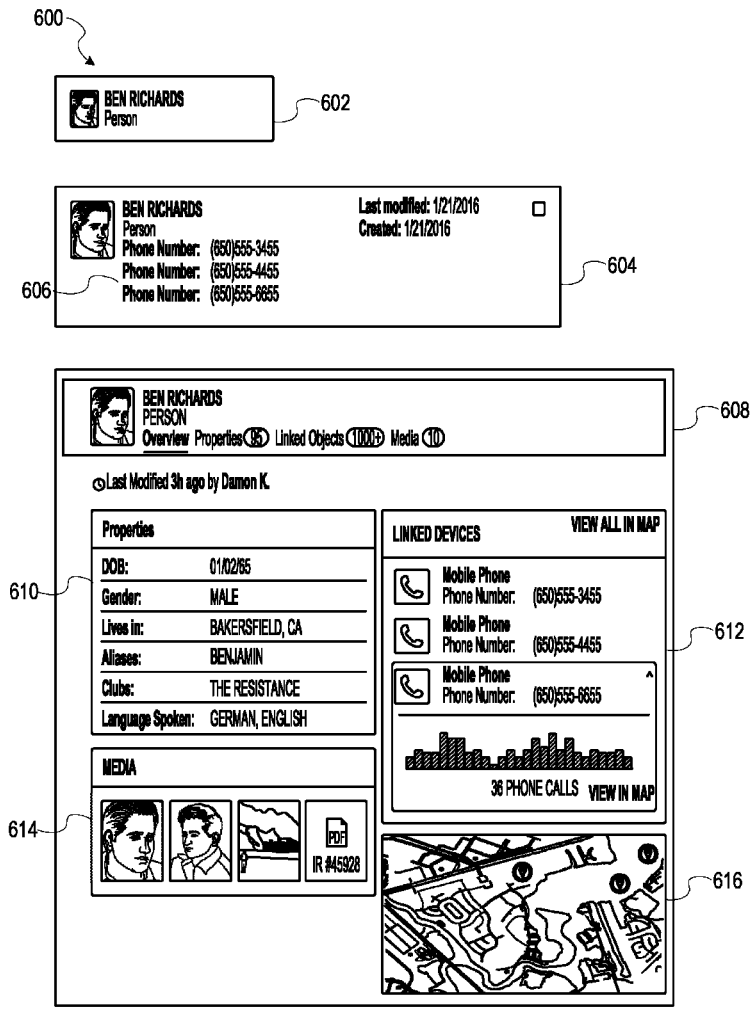
FIG. 6 is an interface diagram illustrating presentations of a data object based on curated ontologies, consistent with some embodiments.

FIG. 6 is an interface diagram illustrating presentations 600 of a data object based on curated ontologies, consistent with some embodiments. FIG. 6 includes a data object 602, a first presentation of a data object 604 that includes a first curation of data objects 606, and a second presentation of the data object 608. The second presentation of the data object 608 includes a second curation of data objects 610, 612, 614, and 616.

As shown in FIG. 6, the data object 602 represents a person. The data object 602 includes object components that may include data properties, media, notes, as well as data links to other data objects within the networked system 102. Data object 602 includes an identifier (e.g., "BEN RICHARDS"), as well as information which defines a data type, a creation time of the data object 602, and in some embodiments, a user that created the data object 702 (e.g., user 106). The data object 602 also includes metadata such as geo-coordinates of the data object 602 (e.g., a location of the user 106 when the user 106 created the data object 602), as well as temporal metadata specifying a point in time in which the data object 602 was created or corresponds.

In some example embodiments, the data object 602 includes object components that define data source information of the data object 602, as well as security information associated with the data object 602. Examples of data sources include databases, spreadsheets, text documents, and individual users. Security information includes permissions associated with the data object 602. Permissions may define access to the data object 602 itself, as well as individual components of the data object 602. For example, the permissions may indicate that only some users may see a data source of the data object 602. The security information associated with the data object 602 may be defined in an access control list associated with the data object 602. Examples of permission levels of a data object are provided in Table-1 below:

TABLE 1

| Permission level | Data access level |
| --- | --- |
| Discovery | Users can be notified that the data exists but can't see it. |
| Read | Users can find and read the data but can't change it |
| Write | Users can find, read, and change the data, |
| Owner | Users can find, read, change, and adjust the permissions on the data. |

As described above in reference to the method 300, a user may provide a request to the ontology curation system 150 to access or view the data object 602. For example, the request may include a reference to an identifier of the data object 602 (e.g., "BEN RICHARDS"), or may include a selection of a graphical representation of the data object 602 displayed within a GUI displayed at the client device(s) 110. In response to receiving the request, the ontology curation system 150 curates an ontology associated with the data object 602 in order to generate and cause display of a presentation of the data object 602 at the client device(s) 110.

The ontology curated by the ontology curation system 150 may be based on request attributes of the request as well as components of the data object 602 itself. As shown in FIG. 6, the first presentation of the data object 604 includes a first curation of data objects 606. For example, the ontology curation system 150 may receive a first request from a first client device from among the client devices 110 to view the data object 602. In response to receiving the first request from the first client device, the ontology curation system 150 curates an ontology based on the request attributes that include characteristics of the first client device. The first presentation of the data object 604 may for example be generated based on user attributes of the user 106 (e.g., security clearance information), and the first client device being identified as a mobile device, or due to the first client device having a small display screen.

The ontology curation system 150 may receive a second request to access the data object 602 from a second client device from among the client device(s) 110. The ontology curation system 150 curates a second curation of data object (e.g., data objects 610, 612, 614, and 616) based on request attributes of the second request that includes device characteristics of the second client device. For example, the ontology curation system 150 may identify that the second client device is a desktop device.

In some example embodiments, as described in FIG. 3, the ontology curation system 150 may curate the ontology based on various request attributes that include work group identifiers of the requesting user (e.g., user 106). For example, the ontology curation system 150 may determine that the first request described above is from a first work group within an organization (e.g., a secretary), whereas the second request is received from a second work group (e.g., sales).

Figure 7:
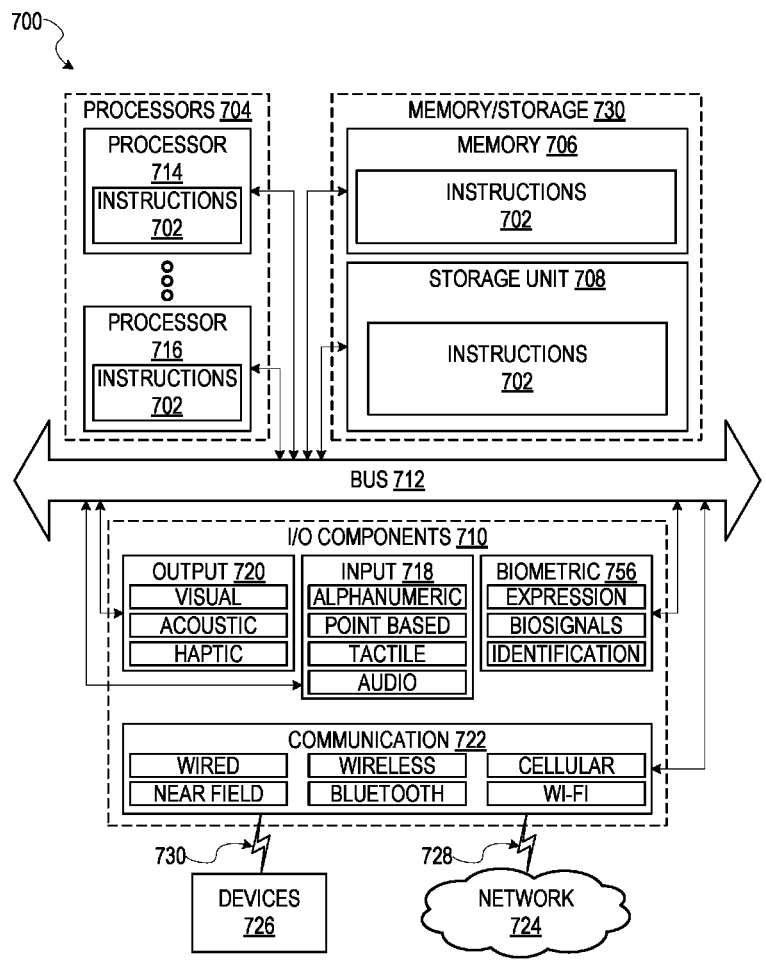
FIG. 7 is a diagrammatic representation of a machine in the example form of a computer system within which a set of instructions for causing the machine to perform any one or more of the methodologies discussed herein may be executed.

FIG. 7 is a diagrammatic representation of a machine in the example form of a computer system within which a set of instructions for causing the machine to perform any one or more of the methodologies discussed herein may be executed. Specifically, FIG. 7 shows a diagrammatic representation of the machine 700 in the example form of a system, within which instructions 702 (e.g., software, a program, an application, an applet, an app, a driver, or other executable code) for causing the machine 700 to perform any one or more of the methodologies discussed herein may be executed. For example, the instructions 702 include executable code that causes the machine 700 to execute the methods 400 and 500. In this way, these instructions 702 transform the general, non-programmed machine into a particular machine programmed to carry out the described and illustrated functions in the manner described herein. The machine 700 may operate as a standalone device or may be coupled (e.g., networked) to other machines.

By way of non-limiting example, the machine 700 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 702, sequentially or otherwise, that specify actions to be taken by machine 700. Further, while only a single machine 700 is illustrated, the term "machine" shall also be taken to include a collection of machines 700 that individually or jointly execute the instructions 702 to perform any one or more of the methodologies discussed herein.

The machine 700 may include processors 704, memory 706, storage unit 708 and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 714 and processor 716 that may execute instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiples cores, or any combination thereof.

The memory 706 (e.g., a main memory or other memory storage) and the storage unit 708 are both accessible to the processors 704 such as via the bus 712. The memory 706 and the storage unit 708 store the instructions 702 embodying any one or more of the methodologies or functions described herein. In some embodiments, the database(s) 126 resides on the storage unit 708. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of processors 704 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine 700 (e.g., processors 704), cause the machine 700 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine will depend on the type of machine. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via coupling 728 and coupling 730, respectively. For example, the communication components 722 may include a network interface component or other suitable device to interface with the network 724. In further examples, communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors of a machine; and
   a memory storing instructions that, when executed by the one or more processors, cause the machine to perform operations comprising:
     receiving a request for a data object from a requesting device, the request including one or more request attributes that include at least a device type of the requesting device;
     accessing a database that includes a set of data objects associated with the data object in response to the receiving the request;

retrieving the set of data objects associated with the data object from the database;

prioritizing the set of data objects associated with the data object based on the one or more request attributes, including the device type of the requesting device; and curating an ontology based on the prioritized set of data objects associated with the data object.

2. The system of claim 1, wherein the database is a primary database, and the operations further comprise:

receiving the set of data objects at the primary database, the set of data objects including the data object, an identifier of the data object, and a time-stamp of the data object;

parsing the set of data objects to retrieve the identifier and the time-stamp;

assigning a foreign key to the identifier and the time-stamp, the foreign key indicating a location of the set of data objects within the primary database; and indexing the foreign key, the identifier, and the time-stamp at a secondary database.

3. The system of claim 2, wherein the request includes the identifier of the data object, and the retrieving the set of data objects from the primary database includes:

retrieving the foreign key from the secondary database based on the identifier; and retrieving the set of data objects from the primary database.

4. The system of claim 2, wherein the secondary database is a relational database.

5. The system of claim 1, wherein the request is a first request, the ontology is a first ontology, and the operations further comprise:

training a machine learned model based on the first request and the request attributes;

receiving a second request that includes the request attributes of the first request; and prioritizing the set of data objects for the second request based on the machine learned model and the request attributes.

6. The system of claim 1, wherein the request is a first request, and the operations further comprise:

receiving a prioritization configuration associated with the request attributes of the request; and wherein the prioritizing the set of data objects is based on the prioritization configuration and the request attributes.

7. The system of claim 1, wherein the operations further comprise:

generating a presentation of the data object based on the ontology; and causing display of the presentation at the requesting device.

8. A non-transitory machine-readable storage medium comprising instructions that, when executed by one or more processors of a machine, cause the machine to perform operations comprising:

receiving a request for a data object from a requesting device, the request including request attributes that include at least a device type of the requesting device;

accessing a database that includes a set of data objects associated with the data object in response to the receiving the request;

retrieving the set of data objects from the database;

prioritizing the set of data objects based on the request attributes, including the device type of the requesting device; and curating an ontology based on the prioritized set of data objects associated with the data object.

9. The non-transitory machine-readable storage medium of claim 8, wherein the database is a primary database, and the operations further comprise:

receiving the set of data objects at the primary database, the set of data objects including at least the data object, an identifier of the data object, and a time-stamp of the data object;

parsing the set of data objects to retrieve the identifier and the time-stamp;

assigning a foreign key to the identifier and the time-stamp, the foreign key indicating a location of the set of data objects within the primary database; and indexing the foreign key, the identifier and the time-stamp at a secondary database.

10. The non-transitory machine-readable storage medium of claim 9, wherein the request includes the identifier of the data object, and the operations for the retrieving the set of data objects from the primary database further comprises:

retrieving the foreign key from the secondary database based on the identifier; and retrieving the set of data objects from the primary database.

11. The non-transitory machine-readable storage medium of claim 9, wherein the secondary database is a relational database.

12. The non-transitory machine-readable storage medium of claim 8, wherein the request is a first request, the ontology is a first ontology, and the operations further comprise:

training a machine learned model based on the first request and the request attributes;

receiving a second request that includes the request attributes of the first request; and prioritizing the set of data objects for the second request based on the machine learned model and the request attributes.

13. The non-transitory machine-readable storage medium of claim 8, wherein the request is a first request, and the operations further comprise:

receiving a prioritization configuration associated with the request attributes of the request; and wherein the prioritizing the set of data objects is based on the prioritization configuration and the request attributes.

14. The non-transitory machine-readable storage medium of claim 8, wherein the operations further comprise:

generating a presentation of the data object based on the ontology; and causing display of the presentation at the requesting device.

15. A method comprising:

receiving a request for a data object from a requesting device, the request including request attributes that include at least a device type of the requesting device;

accessing a database that includes a set of data objects associated with the data object in response to the receiving the request;

retrieving the set of data objects from the database;

prioritizing the set of data objects based on the request attributes, including the device type of the requesting device; and curating an ontology based on the prioritized set of data objects associated with the data object.

16. The method of claim 15, wherein the database is a primary database, and the method further comprises:

receiving the set of data objects at the primary database, the set of data objects including at least the data object, an identifier of the data object, and a time stamp of the data object;

parsing the set of data objects to retrieve the identifier and the time stamp;

assigning a foreign key to the identifier and the time stamp, the foreign key indicating a location of the set of data objects within the primary database; and indexing the foreign key, the identifier, and the time stamp at a secondary database.

17. The method of claim 16, wherein the request includes the identifier of the data object, and the receiving the set of data objects at the primary database includes:

retrieving the foreign key from the secondary database based on the identifier; and retrieving the set of data objects from the primary database.

18. The method of claim 16, wherein the secondary database is a relational database.

19. The method of claim 15, wherein the request is a first request, the ontology is a first ontology, and the method further comprises:

training a machine-learning model based on the first request and the request attributes;

receiving a second request that includes the request attributes of the first request; and prioritizing the set of data objects for the second request based on the machine-learning model and the request attributes.

20. The method of claim 15, wherein the request is a first request, and the method further comprises:

receiving a prioritization configuration associated with the request attributes of the request; and wherein the prioritizing the set of data objects is based on the prioritization configuration and the request attributes.

* * * * *